United States Patent
Schwaiger

(10) Patent No.: US 9,068,594 B2
(45) Date of Patent: Jun. 30, 2015

(54) PIVOT BEARING FOR THE LOW-FRICTION SUPPORT OF COMPONENTS

(75) Inventor: Meinhard Schwaiger, Linz (AT)

(73) Assignee: IAT 21 Innovative Aeronautics Technologies GmbH, Linz (AT)

( * ) Notice: Subject to any disclaimer, the term of this patent is extended or adjusted under 35 U.S.C. 154(b) by 0 days.

(21) Appl. No.: 14/129,130

(22) PCT Filed: Jun. 22, 2012

(86) PCT No.: PCT/EP2012/062051
§ 371 (c)(1),
(2), (4) Date: Aug. 5, 2014

(87) PCT Pub. No.: WO2012/175653
PCT Pub. Date: Dec. 27, 2012

(65) Prior Publication Data
US 2014/0341486 A1    Nov. 20, 2014

(30) Foreign Application Priority Data
Jun. 24, 2011 (AT) .................................. A 931/2011

(51) Int. Cl.
*F16C 32/02* (2006.01)
*F16C 11/06* (2006.01)
*F16C 11/04* (2006.01)

(52) U.S. Cl.
CPC ......... *F16C 32/02* (2013.01); *Y10T 403/32622* (2015.01); *F16C 11/04* (2013.01)

(58) Field of Classification Search
CPC .. F16C 11/04; F16C 32/06; Y10T 403/42622
USPC ................... 384/3, 129, 154; 403/303
See application file for complete search history.

(56) References Cited

U.S. PATENT DOCUMENTS

| | | | | |
|---|---|---|---|---|
| 3,360,255 A | * | 12/1967 | Ormond | 267/154 |
| 3,449,843 A | * | 6/1969 | Streimer | 434/34 |
| 3,811,665 A | * | 5/1974 | Seelig | 267/160 |
| 3,813,089 A | * | 5/1974 | Troeger | 267/160 |
| 3,825,992 A | * | 7/1974 | Troeger | 29/436 |
| 4,637,596 A | * | 1/1987 | Lewis | 267/160 |
| 4,655,629 A | * | 4/1987 | Flaherty | 403/291 |
| 4,908,558 A | * | 3/1990 | Lordo et al. | 318/648 |
| 4,997,123 A | | 3/1991 | Backus et al. | |
| 5,090,613 A | * | 2/1992 | Lee | 228/254 |
| 5,137,372 A | * | 8/1992 | Diggins | 384/12 |
| 5,620,169 A | * | 4/1997 | Payne | 267/160 |
| 6,424,503 B1 | * | 7/2002 | Chin et al. | 360/265.2 |
| 6,442,000 B1 | * | 8/2002 | Koong et al. | 360/256.4 |
| 6,666,612 B2 | * | 12/2003 | Lorigny et al. | 403/291 |
| 6,963,472 B2 | * | 11/2005 | He et al. | 360/265.7 |
| 8,061,228 B2 | * | 11/2011 | Becker et al. | 74/425 |
| 8,303,660 B1 | * | 11/2012 | Abdou | 623/17.14 |

FOREIGN PATENT DOCUMENTS

FR    2 253 347 A5    6/1975

* cited by examiner

*Primary Examiner* — Marcus Charles
(74) *Attorney, Agent, or Firm* — Jordan IP Law, LLC; Todd A. Vaughn

(57) ABSTRACT

A pivot bearing for the low-friction bearing of components, including a cylindrical bearing body and a bearing part pivotably arranged therein. The bearing body has a substantially radially arranged rib, on which at least one first rolling surface is formed, and the bearing part has a rolling body having a cylindrical rolling section at the tip, which rolling section rolls on the rolling surface.

20 Claims, 7 Drawing Sheets

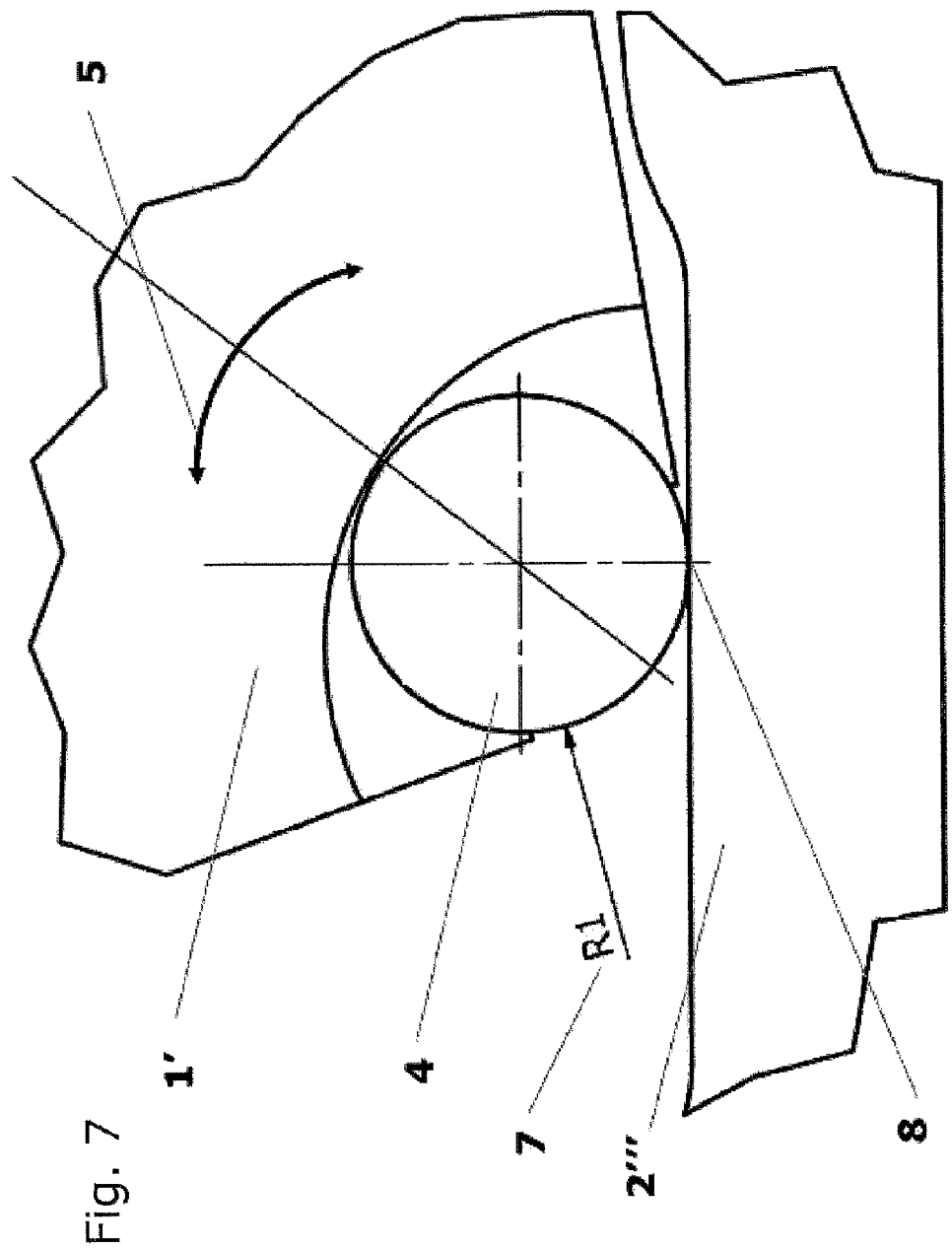

PIVOT BEARING FOR THE LOW-FRICTION SUPPORT OF COMPONENTS

CROSS-REFERENCE TO RELATED APPLICATIONS

The present application is a National Stage Application of PCT International Application No. PCT/EP2012/062051 (filed on Jun. 22, 2012), under 35 U.S.C. §371, which claims priority to Austrian Patent Application No. A 931/2011 (filed on Jun. 24, 2011), which are each hereby incorporated by reference in their respective entireties.

TECHNICAL FIELD

Embodiments relate to a pivot bearing for the low-friction bearing of components, comprising a cylindrical bearing body and a bearing part pivotably arranged therein. The bearing body has a substantially radially arranged rib, on which at least one first rolling surface is formed, and the bearing part has a rolling body having a cylindrical rolling section at the tip, which rolling section rolls on the rolling surface.

BACKGROUND

A heavy-duty pivot bearing is provided in particular, which is preferably used under high radial loads such as centrifuges with considerably reduced friction.

Pivot bearings are used for bearing machine elements which are subjected to a rotational movement about a rotational axis and whose rotational angles do not have a full rotation of 360°. This leads to an oscillating motion about a rotational axis with a more or less constant pivoting angle and an uneven rotational speed between zero and a positive and negative maximum value.

Plain bearings are not especially suitable for such working conditions, because it is hardly possible to build up a hydrodynamic lubricating film as a result of the pivoting movement and the uneven relative speeds between the bearing bolt and the bearing hole. This leads to increased frictional effects and respectively higher wear and tear and low operational lifespan. An acceleration directed radially to the outside is additionally produced in centrifuges (centrifugal acceleration), which leads to the consequence that lubricants will flow together in cylindrical bearing holes in the boundary region of the bearing hole which is farthest away from the center of the rotation and will be conveyed out of the bearing hole in the axial direction in the case of a lack of a suitable bearing seal and will be ejected radially to the outside from the edge of the bearing hole by centrifugal acceleration. This leads to the reduced or hardly provided hydrodynamic lubricating film as a disadvantage in addition to the increased escape of lubricant from the bearing hole and the reduced remaining lubricant volume in the plain bearing.

Rolling bearings usually have a higher weight in comparison to plain bearings (made of plastic) and show an unfavorable distribution of lubricant in the case of high centrifugal accelerations. This promotes increased wear and tear. Within the group of the rolling bearings, needle-roller bearings show the most advantageous conditions (weight, friction, . . . ) for such applications. In the case of such rolling bearings, cylindrical rollers with a rolling body diameter which is smaller in comparison with the bearing diameter are rolled off between the running surface of the outer ring and the inner ring (mostly the bearing bolt). Bearing friction is formed in this case by the rolling friction of the rolling body and the mean radius of the running surfaces of the outer ring and the inner ring. Rolling bearings show lower friction in comparison to plain bearings.

Furthermore, flexible pivot bearings on the basis of elastically deformable thin-walled membranes made of plastic or metal arranged in a crosswise manner are known. Pivot bearings are described in U.S. Pat. No. 3,807,029 A (Troeger H., 1974), U.S. Pat. No. 3,811,665 A (Selig F., 1974), U.S. Pat. No. 3,813,089 A (Troger H., 1974) and U.S. Pat. No. 3,825,992 A (Troeger H., 1974) whose fundamental principle is based on spring elements arranged in a crosswise manner, wherein a cylindrical middle body is inserted into the bearing hole in a twist-proof fashion and a second cylindrical body, which is twistably arranged in relation to the first cylindrical body, is connected to the machine element to be mounted. This produces a one-sided pivot bearing. In a second embodiment, two cylindrical hollow shafts which are rigidly connected to each other are connected by means of crosswise arranged membranes in relation to the middle body inserted in a twist-proof fashion into the bearing hole in such a way that a torque or a rotational motion can be transmitted from one lateral part to the other. As a result, a rotational movement can be transmitted by the middle body from one side to the opposite side. Such pivot bearings operate in a friction-free manner, but come with the disadvantage that only relatively low radial forces can be absorbed and only low pivoting angles can be carried out. Typical maximum pivoting angles lie in the range of approximately +/−30° (in the case of very low radial loads) and pivoting angles of only a few degrees can be carried out under higher loads. For this reason, such elastic pivot bearings are used only where very low radial forces occur such as in storage drives of computers, measuring devices and the like. A further elastic pivot bearing is known from U.S. Pat. No. 5,505,555 A (Van Kann Frank J; Buckingham Michael J, 1996), which also shows the aforementioned limitations and is therefore only used in special measuring appliances such as acceleration sensors for example.

Great Britain Patent Publication No. GB 146,119 A describes a joint arrangement in which tensile forces are transmitted via profiled surfaces. In the case of pressure forces, the joint arrangement acts in the manner of a plain bearing with respective disadvantages.

SUMMARY

It is the object of embodiments to provide a heavy-duty pivot bearing for larger pivoting angles with which the disadvantages of heavy-duty plain bearings in centrifuges, the disadvantages of rolling bearings and the disadvantages of elastic pivot bearings can be reduced substantially. In particular, it shall be possible to securely absorb forces in any direction.

These objects are achieved in accordance with embodiments in such a way that the bearing part has two sections, namely a retaining part and a connecting part, which are arranged on both sides of the rib. This means in particular that a rolling body is arranged in a rollable manner on a rigid rolling surface arranged approximately in the central axis of the pivot bearing and said rolling body is a fixed component of the pivotable bearing part. The rolling section typically has a considerably smaller diameter than the bearing body of the pivot bearing. The pivoting motion is primarily produced in accordance with embodiments by a rolling motion of the rolling body, so that sliding friction is substantially prevented. An especially high mechanical stability can be achieved by the connecting part.

Impermissible play can especially be prevented in such a way that the bearing part comprises a retaining part which has a cross-section which is substantially shaped in the manner of a sector of a circle. The relevant aspect in the cross-section of the retaining part shaped in the manner of a sector is that the tangent of the retaining part which is parallel to the rolling surface remains unchanged during the rolling motion. If the rolling body has a non-circular cross-section, the cross-section of the retaining part deviates from an arrangement shaped in the manner of a circle sector in such a way that an "orbiform curve" is obtained, which again comprises a constant upper tangent.

It is provided in an especially advantageous way that the bearing body comprises a centering part which is substantially arranged in a semi-cylindrical way. The centering part substantially determines the degree of freedom of the bearing part.

An impermissible movement of the bearing part is prevented in such a way that the centering part has a sliding surface which is opposite of the rolling surface. The bearing part always rests on the sliding surface during its motion or is slightly remote from the sliding surface during loading. In any case, impermissible play in all positions is prevented in this manner.

A further especially advantageous embodiment provides that the centering part comprises centering surfaces in the region of the rib. The centering surfaces delimit a possible lateral movement of the bearing part.

An especially compact arrangement of the pivot bearing is achieved when the bearing body respectively comprises a semi-cylindrical shell on both sides of the rib, which shell holds the rib.

The kinematics of the pivot bearing is especially advantageous when the rolling surface is sunk in relation to the central point of the pivot bearing. This means that the central point lies outside of the rib. Furthermore, it is especially advantageous if the central point of the rolling body has a distance from the central point of the pivot bearing which is smaller than the radius of the rolling body. If the rib is therefore situated beneath the central point of the pivot bearing, the central point of the rolling bearing is situated above said central point.

It is especially advantageous if the connecting part has a cross-section which is substantially shaped in the manner of a circle sector. An optimal loading cross-section can be achieved in this way.

DRAWINGS

Embodiments will be explained below in closer detail by reference to embodiments shown in the schematic drawings, wherein:

FIG. 7 illustrates a detail of FIG. 6.

DESCRIPTION

Figure 1:
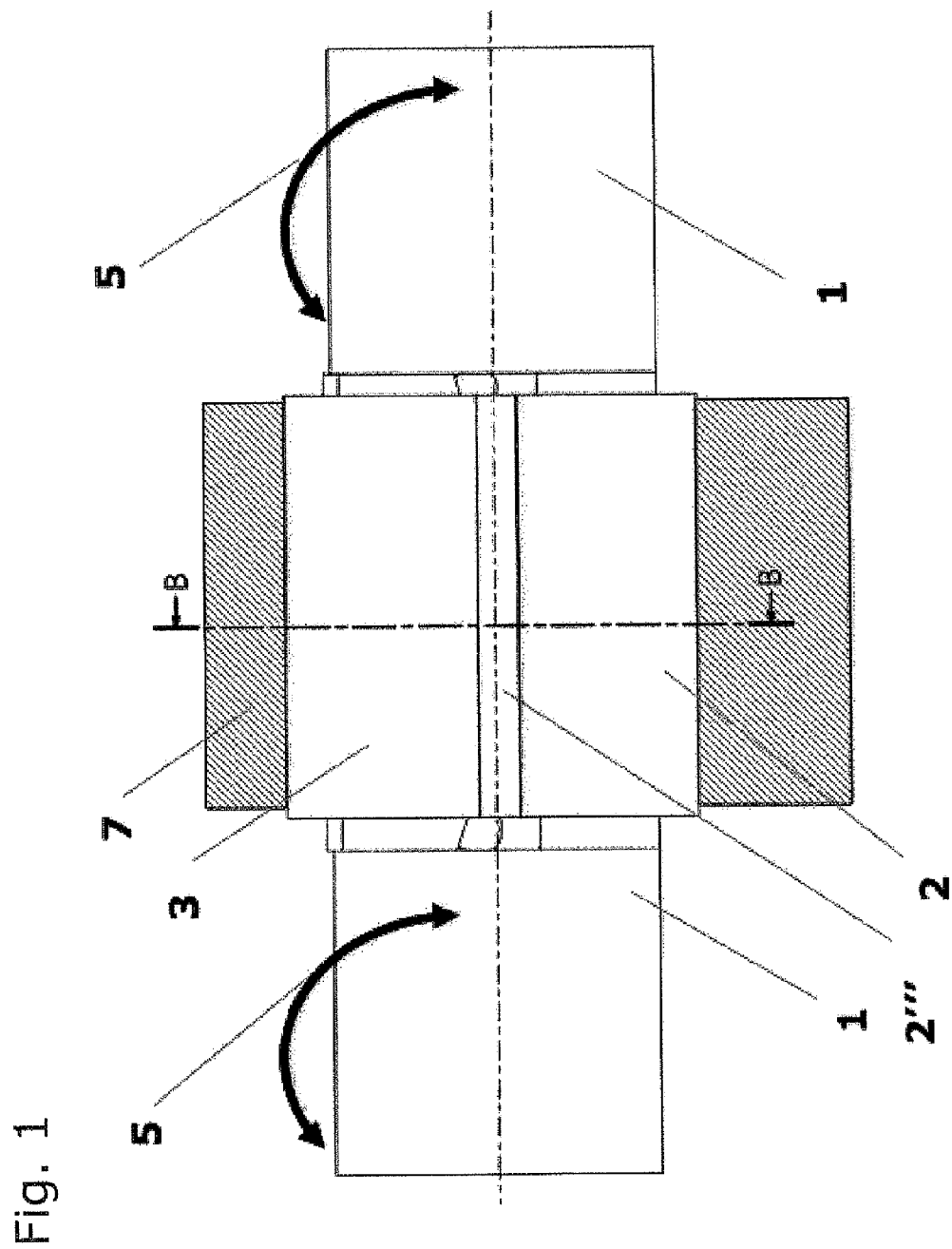
FIG. 1 illustrates a general side view of a pivot bearing.

FIG. 1 illustrates a pivot bearing configuration in accordance with embodiments in a side view. The pivot bearing configuration consists of a pivotable bearing part 1, which is inserted into a cylindrical bearing body 2, 2''', 3, which is arranged in a twist-proof fashion in a bearing hole in a machine element 7 (not shown in closer detail) such as a centrifuge. The pivotable bearing part 1 is pivotable in the pivoting direction 5 in relation to the fixed cylindrical bearing body 2, 2''', 3. The connecting part 1'' is used for mechanical stability, because in this way the loadable cross-section of the bearing part can be increased substantially. Deformations are prevented in particular by the increased bending stiffness, which would otherwise lead to a change in the geometric properties in the engagement region, which would lead to a considerable reduction in the operational lifespan.

Figure 2:
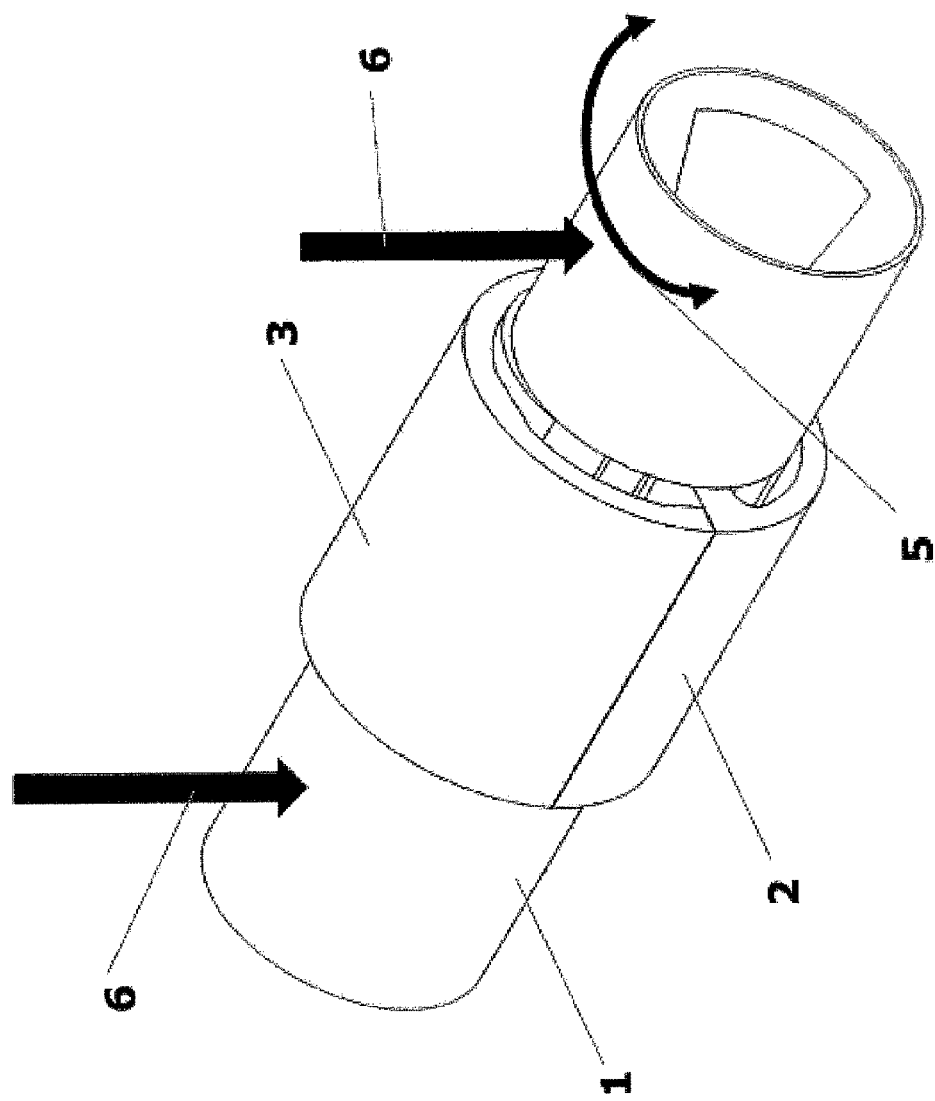
FIG. 2 illustrates an axonometric view of the bearing of FIG. 1.

FIG. 2 illustrates the pivot bearing configuration in accordance with embodiments in an oblique view with the preferred loading direction 6 and the pivoting direction 5.

Figure 3:
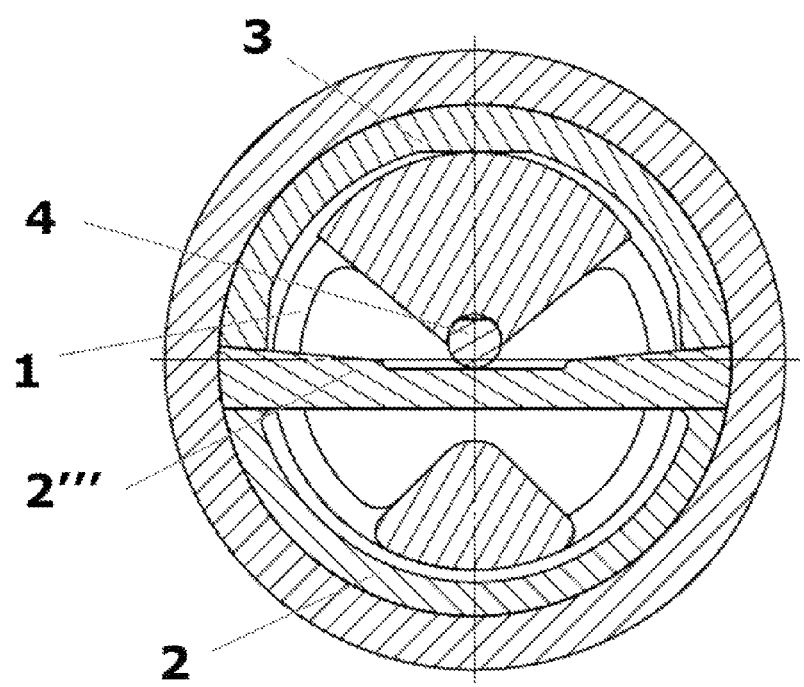
FIG. 3 illustrates an exploded view of the bearing of FIG. 1 in an axial view.

FIG. 3 illustrates the pivot bearing configuration in accordance with embodiments in an exploded view and a sectional view along the line of intersection B-B of FIG. 1. The centering part 3 is integrally connected in relation to the rib 2''' and the retaining part 2 in the mounted state and is held together in the bearing hole. A rolling body 4, which is rigidly connected to the pivotable bearing part 1, is rolled off on the rib 2''' during a pivoting motion. The rib 2''' extends substantially along the cylindrical space which is spanned by the retaining part 2 and the centering part 3.

Figure 4:
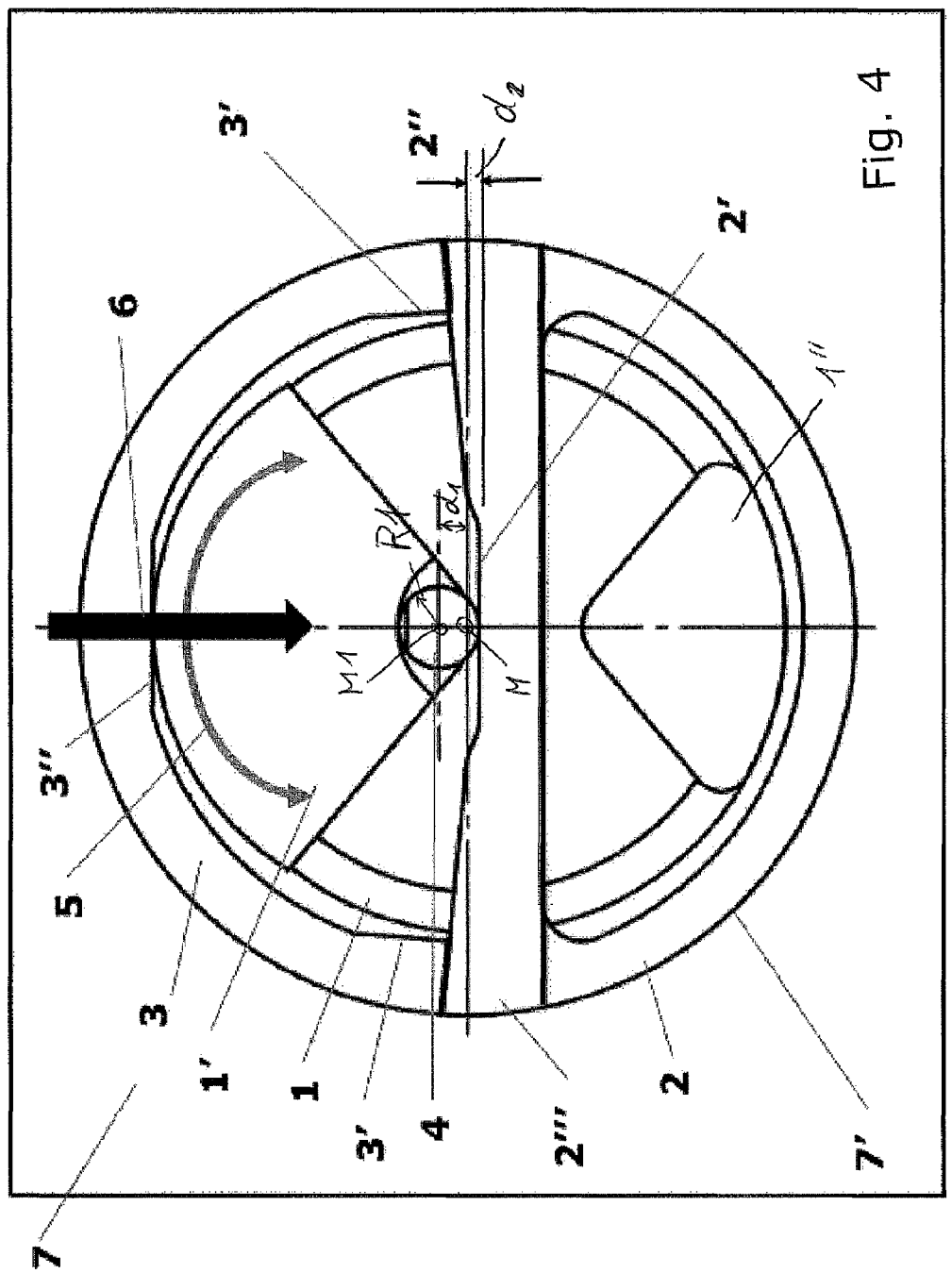
FIG. 4 illustrates an axial view on an enlarged scale.

FIG. 4 illustrates shows the pivot bearing configuration in accordance with embodiments in the mounted state in a sectional view along the line of intersection B-B of FIG. 1. The cylindrical bearing body 2, 2''', 3 is inserted in a twist-proof fashion into the bearing hole 7' of the machine element 7 and the pivotable bearing part 1, which is rigidly connected to the rolling body 4, is moved according to the pivoting motion 5, wherein a rolling motion of the rolling body 4 occurs on the rolling surface 2'. The pivotable bearing part 1 has a contour arranged as an "orbiform curve" over the length of the centering part 3 in the outer contour of the retaining part 1', so that during a pivoting movement 5 the pivotable bearing part 1 is guided by means of the sliding surface 3'' and is held in a virtually centric manner in the two end positions by means of the centering surfaces 3'. Under a load according to arrow 6, the outer contour of the retaining part 1' of the pivotable bearing part 1 is released in relation to the centering surface 3' as a result of elastic deformation and remains friction-free under relative movement. In order to achieve a substantially centric pivoting movement, the rolling surface 2' is offset by the amount 2'' (d2) in relation to the central point of the bearing.

The central point M1 of the rolling body 4 has a distance d1 from the central point M of the pivot bearing. The distance d1 is smaller than the radius R1 of the rolling body 4 and is 80% of R1, for example.

Figure 5:
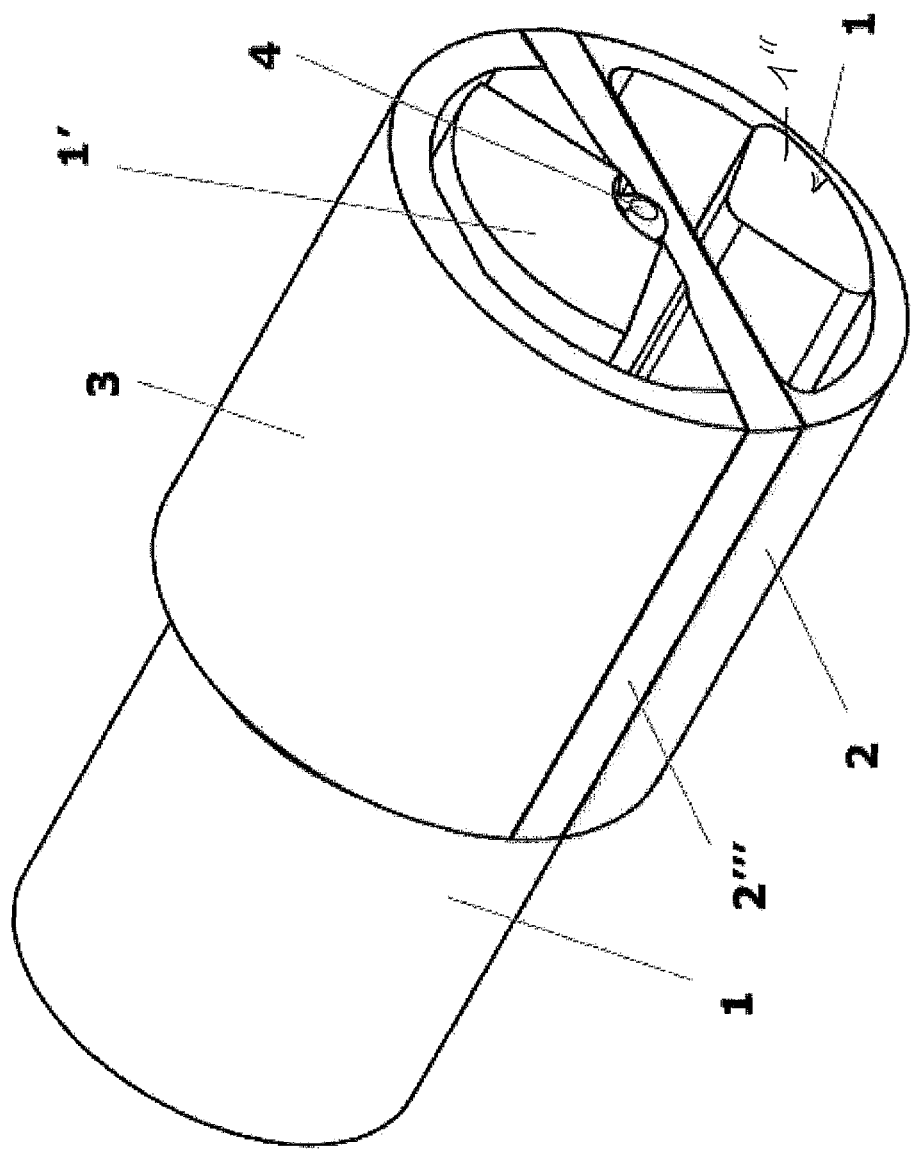
FIG. 5 illustrates an axonometric view of the pivot bearing of FIG. 4.

FIG. 5 illustrates the pivot bearing in accordance with embodiments in an oblique view intersected along the line of intersection B-B of FIG. 1.

Figure 6:
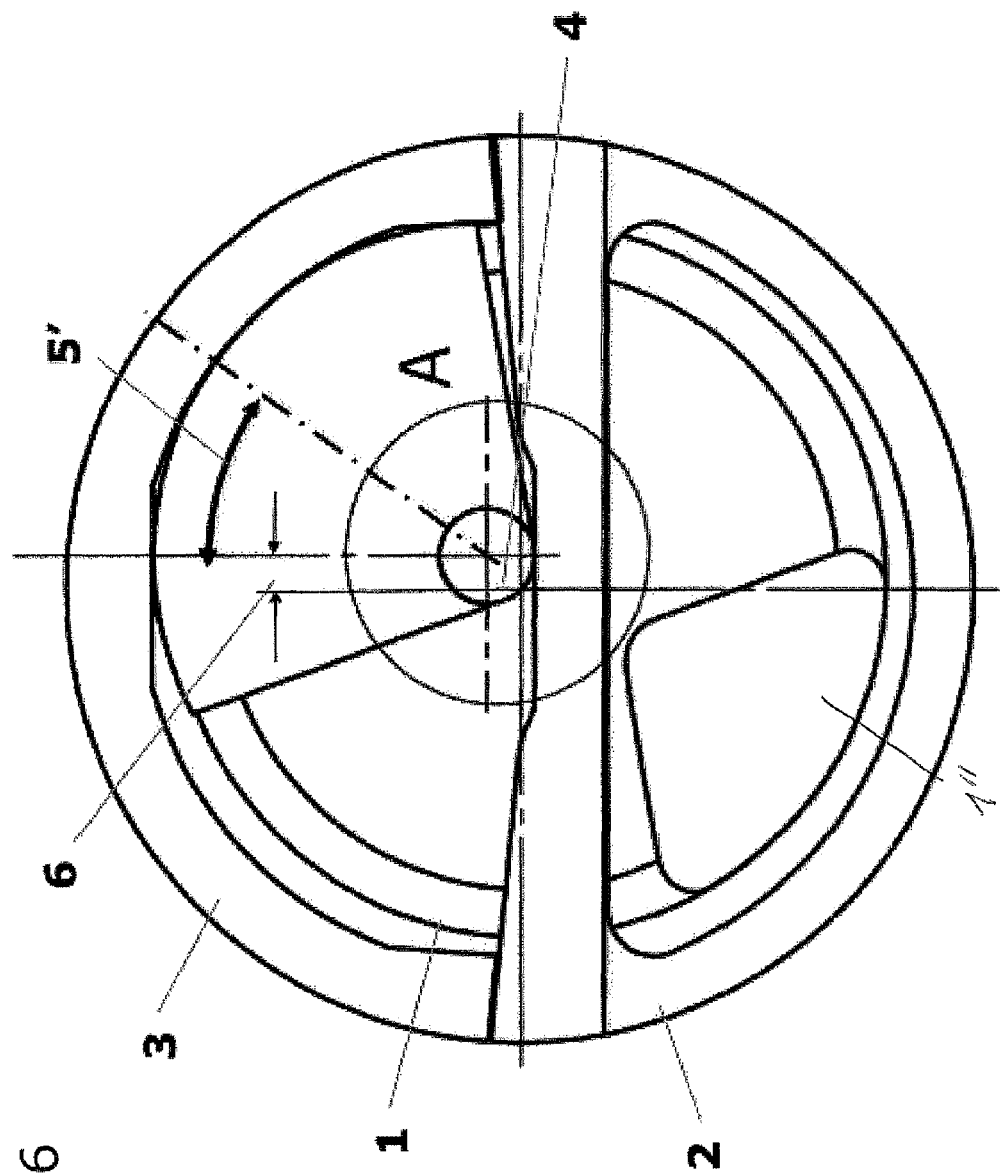
FIG. 6 illustrates a view of FIG. 4 in another position of the pivot bearing.

FIG. 6 illustrates the pivot bearing in accordance with embodiments in a sectional view along the sectional line B-B in FIG. 1 and the pivoting/rolling process. The rolling body 4 is rolled on the rolling surface 2' during a pivoting movement by the amount 5' and the central point of the rolling body 4 is deflected by the amount 6 parallel to the rolling surface 2'. As a result of the diameter of the rolling body 4 which is small in relation to the diameter of the pivot bearing (the ratio is approximately 1:5 to 1:20), the deflecting movement is also low and is approximately 0.5% to 5% of the pivot bearing diameter.

FIG. 7 illustrates a detailed view of FIG. 6. The rolling body 4 rolls on the rolling surface 2' and has a radius R1 7 and a contact point 8.

What is claimed is:

1. A pivot bearing for low-friction bearing of components, comprising a cylindrical bearing body (2, 2''', 3) and a bearing part (1) pivotably arranged therein, wherein the bearing body (2, 2''', 3) has a substantially radially arranged rib (2'''), on which at least one first rolling surface (2') is formed, and wherein the bearing part (1) has a rolling body (4) having a cylindrical rolling section at the tip, which rolling section rolls on the rolling surface (2'), characterized in that the bearing part (1) has two sections, namely a retaining part (1') and a connecting part (1"), which are arranged on both sides of the rib (2''').

2. A pivot bearing according to claim 1, characterized in that the retaining part (1') has a cross-section which substantially has the shape of a circle sector.

3. A pivot bearing according to claim 2, characterized in that the bearing body (2, 2''', 3) has a centering part (3) which is substantially arranged in a semi-cylindrical way.

4. A pivot bearing according to claim 3, characterized in that the centering part (3) has a sliding surface (3") which is opposite of the rolling surface (2').

5. A pivot bearing according to claim 4, characterized in that the centering part (3) comprises centering surfaces (3') in the region of the rib (2''').

6. A pivot bearing according to claim 5, characterized in that the bearing body (2, 2''', 3) respectively comprises a semi-cylindrical shell (2, 3) on both sides of the rib (2'''), which shell holds the rib (2''').

7. A pivot bearing according to claim 6, characterized in that the rolling surface (2') is sunk in relation to the central point (M) of the pivot bearing.

8. A pivot bearing according to claim 7, characterized in that the central point (M1) of the rolling bearing (4) has a distance ($d_1$) from the central point (M) of the pivot bearing which is smaller than the radius (R1) of the rolling body (4).

9. A pivot bearing according to claim 8, characterized in that the rib (2''') substantially extends along a diameter of the bearing hole.

10. A pivot bearing according to claim 8, characterized in that the connecting part (1") has a cross-section which is substantially shaped in the manner of a circle sector.

11. A pivot bearing for low-friction bearing of components, comprising:
 a bearing body having a substantially radially arranged rib upon which at least one first rolling surface is formed; and
 a bearing part pivotably arranged in the bearing body, the bearing part having a retaining part and a connecting part which are arranged on sides of the rib, and a rolling body with a cylindrical rolling section at a tip thereof, the rolling section configured to roll on the first rolling surface.

12. The pivot bearing of claim 11, wherein the retaining part has a cross-section which has a cross-section of a circle sector.

13. The pivot bearing of claim 11, wherein the bearing body comprises a centering part having a semi-cylindrical cross-section.

14. The pivot bearing of claim 13, wherein the centering part has a sliding surface which is spatially opposite of the rolling surface.

15. The pivot bearing of claim 14, wherein the centering part comprises centering surfaces in a region of the rib.

16. The pivot bearing of claim 11, wherein the bearing body comprises a semi-cylindrical shell on sides of the rib and which holds the rib.

17. The pivot bearing of claim 11, wherein the rolling surface is sunk in relation to a first central point of the pivot bearing.

18. The pivot bearing of claim 17, wherein a second central point of the rolling body has a distance from the first central point of the pivot bearing which is less than a radius of the rolling body.

19. The pivot bearing of claim 11, wherein the rib extends along a diameter of a bearing hole which receives the bearing part.

20. The pivot bearing of claim 11, wherein the connecting part has a cross-section which is shaped in the manner of a circle sector.

* * * * *